United States Patent [19]
Brown et al.

[11] 3,843,673
[45] Oct. 22, 1974

[54] BIS-1(1,2,4-TRIAZOLE-3-SELENOLS)
[75] Inventors: John Colin Brown; Patrick Joseph Keogh, both of Ilford, England
[73] Assignee: Ilford Limited, Ilford, Essex, England
[22] Filed: Dec. 17, 1971
[21] Appl. No.: 209,339

[30] Foreign Application Priority Data
Dec. 22, 1970  Great Britain.................... 60801/70

[52] U.S. Cl. ........................... 260/308 R, 96/60 BF
[51] Int. Cl............................................. C07d 55/06
[58] Field of Search................................. 260/308 R

[56] References Cited
UNITED STATES PATENTS
3,671,467  6/1972  Gunther.............................. 260/308
3,705,896  12/1972  Bailey............................. 260/308 X Primary Examiner—John M. Ford
Attorney, Agent, or Firm—Wenderoth, Lind & Ponack

[57] ABSTRACT

Novel bis-(1,2,4-triazole-3-selenols) of the formula (Ia) A—X—A′ wherein A and A′ each represents a 1,2,4-triazole radical bound in its 3-position to X, bound in its 5-position to an HSe-group, one nitrogen atom of each 1,2,4-triazole ring being bound to a hydrogen atom, an alkyl group, an aryl group or an aralkyl group, and X represents a direct link or, as a divalent linking group, an alkylene group having up to 10 carbon atoms or a linking group of the composition $-(CH_2)_m-Y-(CH_2)_n-$, Y standing for an oxygen atom or a sulphur atom or a group $-NR_3-$ when $R_3$ is a hydrogen atom or an alkyl group or an aryl group or an aralkyl group and each of $m$ and $n$ are integers of 0 to 5, or X represents a phenylene nucleus or napthalene nucleus linking group.

12 Claims, No Drawings

BIS-1(1,2,4-TRIAZOLE-3-SELENOLS)

According to the present invention there is provided a bis(1,2,4-triazole-3-selenol) of the formula (Ia) A — X — A' wherein A and A' each represents a 1,2,4-triazole radical bound in its 3-position to X, bound in its 5-position to an HSe-groups, one nitrogen atom of each 1,2,4-triazole ring being bound to a hydrogen atom, an alkyl group an aryl group or an aralkyl group, and X represents a direct link or, as a divalent linking group, an alkylene group having up to 10 carbon atoms or a linking group of the composition $-(CH_2)_m-Y-(CH_2)_n$, Y standing for an oxygen atom or a sulphur atom or a group $-NR_3-$ where $R_3$ is a hydrogen atom or an alkyl group or an aryl group or an aralkyl group and each of m and n are integers of 0 to 5, or X represents a phenylene nucleus or naphthalene nucleus linking group.

The bis-(1,2,4-triazole-3-selenols) of this invention may also be represented by the formula

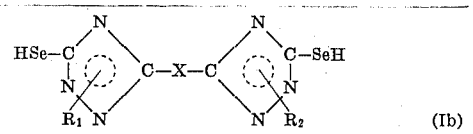
(Ib)

wherein $R_1$ and $R_2$ are identical or different and each represent a hydrogen atom, an alkyl group, an aryl group or an aralkyl group and X has the meaning given.

Alternatively these (1,2,4-triazole-3-selenols) may be represented by the formula (Ic) 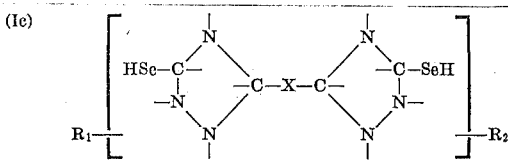

wherein $R_1$, $R_2$ and X have the same meanings as in formula (Ib) and the valence bonds not saturated by $R_1$, $R_2$, HSe and X indicate the double bonds in the 1,2,4-triazole rings. 5,5'-Bis-(1,2,4-triazole-3-selenols) corresponding to formulae Ia, Ib and Ic wherein each of $R_1$ and $R_2$ are selected from a hydrogen atom, alkyl preferably methyl and aryl preferably phenyl, aralkyl preferably benzyl and X is a direct link, an alkylene chain having 1 to 4, preferably 1 or 2 carbon atoms, a phenylene group or a linking group $-(CH_2)_m-Y-(CH_2)_n-$ wherein Y is oxygen or sulphur, preferably a sulphur atom and each of m and n are integers of 1 to 5, preferably 1 or 2 are of particular interest.

The 5,5'-Bis-(1,2,4-triazole-3-selenols) of the present invention may be of asymmetrical or preferably symmetrical structure, viz. $R_1$ and $R_2$ may be different from one another or preferably are identical.

If $R_1$ or $R_2$ are not hydrogen atoms the bis-triazoles exist in different isomeric forms e.g.

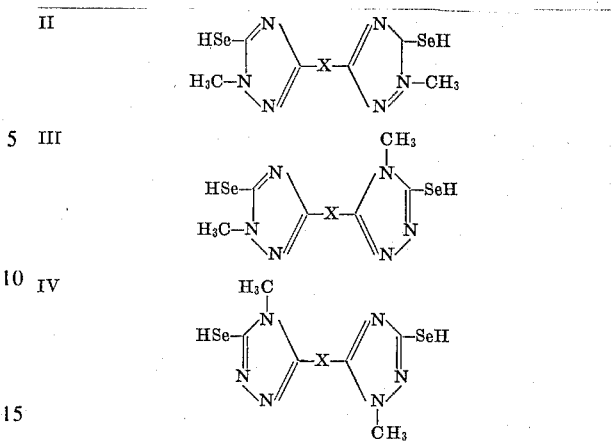

Further it is to be understood that the 5,5'-bis-(1,2,4-triazole-3-selenols) of the present invention have been defined and formulated with reference to their selenol form but these compounds may exist and be produced in their tautomeric selenone form. For example the 5,5'-bis-(1,2,4-triazole-3-selenol) of formula I may exist as an selenone of the general formula (V):

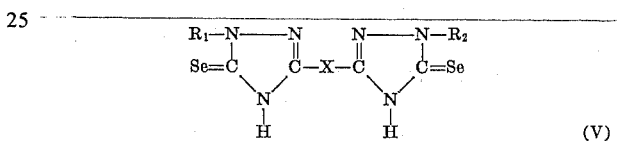
(V)

According to another feature of the present invention symmetrical 5,5'-bis-(1,2,4-triazole-3-selenols) as hereinbefore defined are prepared by reacting two mols of a selenosemicarbazide of the general formula (V):

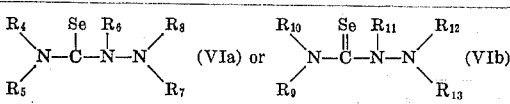

where each of $R_4 - R_{13}$ is a hydrogen atom or one of them is an alkyl, aryl or aralkyl group the remainder being hydrogen atoms with a mol of a dibasic acid chloride of the general formula Cl CO—X—CO Cl where X is a divalent linking group as hereinbefore defined or a direct link in the presence of a base to form the acyl bis-selenosemicarbazide and then ring closing the acyl compound by heating it in a basic medium. Acyl bis-selenosemicarbazides are described in our co-pending U.S. application Ser. No. 209,340. Preferably the acylation reaction is carried out in an organic solvent, e.g., methanol or pyridine at a reduced temperature. The ring closure reaction may be carried out in the presence of an alkali metal acetate, carbonate, hydroxide or ethoxide.

Preferably the above preparation is carried out in two stages that is to say the acyl derivative is isolated and purified before it is ring closed.

Alternatively symmetrical 5,5'-bis(1,2,4-triazole-3-selenol)s as hereinbefore defined are prepared by heating together 2 mols of a selenosemicarbazide of the general formula (VIa) or (VIb) and 1 mol of a diester of a dibasic acid of the general formula $R_{14}OCO - X - COOR_{15}$ wherein each of $R_{14}$ and $R_{15}$ is an alkyl or aralkyl group and X has the meaning given above in an alkaline alcoholic medium and isolating and purifying the product.

Unsymmetrical 5,5'-bis(1,2,4-triazole-3-selenol)s as hereinbefore defined may be prepared by reacting a selenosemicarbazide of the general formula (VIa) or (VIb) with an acid chloride-half ester of a dibasic acid of the general formula $R_{14}OCO — X — CO\,Cl$ wherein $R_{14}$ and X have the meanings given above in the presence of a base to form the half-ester-acyl compound of the selenosemicarbazide used, isolating and purifying the compound obtained and then heating it with a mol of a selenosemicarbazide of the general formula (VIb) or (VIa) respectively in an alkaline alcoholic medium and isolating the product.

Alternatively unsymmetrical 5,5'-bis-(1,2,4-triazole-3-selenols) as hereinbefore defined may be prepared by reacting a mol of a selenosemicarbazide of the general formula (VIa) or (VIb) with an excess of a diester of a dibasic acid of the general formula $R_{14}OCO—X—OCOR_{15}$ wherein $R_{14}$, $R_{15}$ and X have the meanings given above in an alkaline alcoholic medium isolating and purifying the product obtained and then reacting the product with a mol of a selenosemicarbazide of the general formula (VIb) or (VIa) respectively in an alkaline alcoholic medium and isolating and purifying the product.

The following dibasic acid chlorides are of use in the preparation of the symmetrical 5,5'-bis-(1,2,4-triazole-3-selenols) in the first preparation hereinbefore set forth:

```
        CO—Cl
        |
        CO—Cl

CH₂—COCl
        |
        COCl

CH₂—COCl
        |
        CH₂—COCl
```

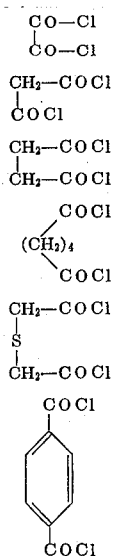

```
        CH₂—COCl
        |
        S
        |
        CH₂—COCl
```

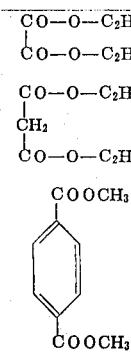

The following diesters of dibasic acids are of use in the preparation of the symmetrical and unsymmetrical 5,5'-bis-(1,2,4-triazole-3-selenols) in the second and fourth preparations hereinbefore set forth:

```
        CO—O—C₂H₅
        |
        CO—O—C₂H₅

CO—O—C₂H₅
        |
        CH₂
        |
        CO—O—C₂H₅
```

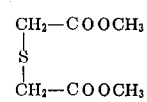

```
        CH₂—COOCH₃
        |
        S
        |
        CH₂—COOCH₃
```

The following acid chloride-half esters of dibasic acids are of use in the preparation of the unsymmetrical 5,5'-bis-(1,2,4-triazole-3-selenols) in the third preparation as hereinbefore set forth:

```
        CO—O—C₂H₅
        |
        CO—Cl

CO—O—CH₃
        |
        (CH₂)₂
        |
        CO—Cl
```

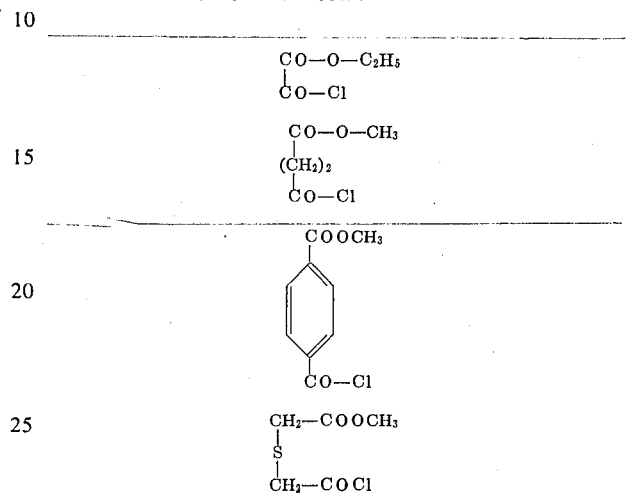

```
        CH₂—COOCH₃
        |
        S
        |
        CH₂—COCl
```

The selenosemicarbazides of the above formulae (VIa) and (VIb) are known compounds as shown by the references set forth below.

The following formula (VII) indicates the nitrogen atom referred to in the references.

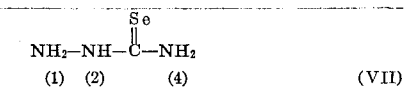

4-phenylselenosemicarbazide - preparation described by Jensen & Frederiksen. Z. anaorg. allgem. Chem. 230 31–3 (1936)

2-phenylselenosemicarbazide - preparation described by Mautner & Kumler. J. Amer. Chem. Soc. 97–101 (1956)

4-ethylselenosemicarbazide - preparation described by Huls & Renson Bull. soc. chim. Belges 65 684–95 (1966)

4-propylselenosemicarbazide - preparation described by Colland-Charon, Huls & Renson, Bull. soc. chim. Belges 71 541–53 (1962)

1-phenylselenosemicarbazide and
1-(p-tolyl) selenosemicarbazide - preparation described by Colland-Charon, Huls & Renson, Bull. soc. chim. Belges 71 554–62 (1962)

1-methylselenosemicarbazide,
2-methylselenosemicarbazide,
4-methylselenosemicarbazide, - preparations described by Jensen, Felbert, Pedersen & Svanholm Acta. chem. Scand. 20(1) 278–81 (1966)

4-(p-chlorophenyl) selenosemicarbazide and
4(p-methoxyphenyl) selenosemicarbazide - preparations described by Bulka, Ahlens & Tucek Chem. Ber. 100(4) 1373-8 (1967)

The 5,5'-bis-1,2,4-triazole-3-selenols of the present invention are of use as bleach-fix accelerators as described in our co-pending U.S. application Ser. No. 100,839, now U.S. Pat. No. 3,702,248.

Example 1

Preparation of 5,5'-bis(1,2,4-triazole-3-selenol).

(a) Oxalyl-1,1'-bis(selenosemicarbazide)

Oxalyl chloride (3.0 g) was added with stirring to a slurry of selenosemicarbazide (6.4 g) in dry distilled pyridine (50 ml). After a vigorous reaction, the resulting dark red brown solution was stirred at room temperature for a further 3½ hours. Water (50 ml) was then added, and the mixture was evaporated in vacuo to give a black oily residue, which was dissolved in 10 percent sodium hydroxide solution (20 ml) and filtered. Acidification of the filtrate with glacial acetic acid (20 ml) gave oxalyl-1-1'-bis (selenosemicarbazide) as an orange solid (1.2 g), m.p. 193° C (decomp.).

(b) 5,5-bis(1,2,4-triazole-3-selenol).

Oxalyl-1,1'-bis(selenosemicarbazide) (0.8 g) and 10 percent sodium hydroxide solution (10 ml) were heated in a steam-bath for 20 minutes, then cooled and acidified with concentrated hydrochloric acid. The orange-red precipitate was filtered off, washed with water, and dried. A further quantity of solid was obtained from the filtrate by evaporation. Total yield 0.4 g 5,5-bis(1,2,4-triazole-3-selenol) of m.p. 360° C.

Example 2

5,5'-bis(1,2,4-triazole-3-selenol) (alternative preparation)

Selenosemicarbazide (6.9 g) and diethyl oxalate (2.95 g) were added to a solution of sodium (1.15 g) in methanol (50 ml), and the mixture was heated under reflux for 16 hours. The solvent was then evaporated in vacuo, and water (50 ml) was added. The solution was filtered to remove any selenium and residual selenosemicarbazide. The filtrate was acidified with concentrated hydrochloric acid, giving an orange precipitate, which was filtered off, washed with hot ethanol and water, and dried. 5,5'-bis(1,2,4-triazole-3-selenol) obtained (3.5 g) had an infrared spectrum identical with that of the product prepared in Example 1.

Using the method described in Example 2, the compounds of the following Examples were prepared.

Example 3
Preparation of
methylene-5,5'-bis(1,2,4-triazole-3-selenol)

Selenosemicarbazide (13.8 g) was reacted with diethyl malonate (8.0 g) in the presence of sodium methoxide to give 5.0 g of methylene-5,5'-bis(1,2,4-triazole-3-selenol) of m.p. 180° – 183° C (decomp).

Example 4
Preparation of
ethylene-5,5'-bis(1,2,4-triazole-3-selenol)

Selenosemicarbazide (13.8 g) was reacted with diethyl succinate (8.7 g) in the presence of sodium methoxide to give 5.4 g of ethylene-5,5'-bis(1,2,4-triazole-3-selenol) of m.p. 210° C (decomp).

Example 5
Preparation of methylene
5,5'-bis(2-methyl-1,2,4-triazole-3-selenol)

2-methylselenosemicarbazide (15.2 g) was reacted with diethyl malonate (8 g) in the presence of sodium methoxide for 22 hours to give 0.2 g of methylene 5,5'-bis(2-methyl-1,2,4-triazole-3-selenol) of m.p. 189° C.

Example 6
Preparation of
methylene-5,5'-bis(4-methyl-1,2,4-triazole-3-selenol)

4-methylenselenosemicarbazide (15.2 g) was reacted with diethyl malonate (8 g) in the presence of sodium methoxide for 22 hours to give 3.5 g of methylene-5,5'-(4-methyl-1,2,4-triazole-3-selenol) of m.p. 204° C.

Example 7
Preparation of
ethylene-5,5'-bis(4-methyl-1,2,4-triazole-3-selenol)

4-methylselenosemicarbazide (15.2 g) was reacted with diethyl succinate (8.0 g) in the presence of sodium methoxide for 18 hours to give 1.8 g ethylene-5,5'-bis(4-methyl-1,2,4-triazole-3-selenol) of m.p. 244°C.

Example 8
Preparation of
ethylene-5,5'-bis(4-phenyl-1,2,4-triazole-3-selenol)

4-phenylselenosemicarbazide (10.7 g) was reacted with diethyl succinate (4 g) in the presence of sodium methoxide for 18 hours to give ethylene-5,5'-bis(4-phenyl-1,2,4-triazole-3-selenol which sintered at 203° C.

Example 9
Preparation of
5,5'-bis(2-methyl-1,2,4-triazole-3-selenol)

2-methylselenosemicarbahide (7.6 g) was reacted with diethyl oxalate (3. g) in the presence of sodium methyoxide for 2 hours to give 5,5'-bis(2-methyl-1,2,4-triazole-3-selenol) which sintered at 196° C.

Example 10
Preparation of
5,5'-bis(4-methyl-1,2,4-triazole-3-selenol)

4-methylselenosemicarbazide (7.6 g) was reacted with diethyl oxalate (3. g) in the presence of sodium methyoxide for half an hour to give 1.7 g of 5,5'-bis(4-methyl-1,2,4-triazole-3-selenol which sintered at 231°C.

Example 11
Preparation of
(thiodiethylene)-5,5'-bis(4-methyl-1,2,4-triazole-3-selenol)

4-methylselenosemicarbazide (7.6 g) was reacted with the dimethyl ester of the ββ'-thiodi-propionic acid (5 g) in the presence of sodium methoxide for 7 hours to give 1.2 g of (thiodiethylene)-5,5'-bis(4-methyl-1,2,4-triazole-3-selenol) of m.p. 200° C.

Example 12
Preparation of
5,5'-bis(4-phenyl-1,2,4-triazole-3-selenol)

4-phenylselenosemicarbazide (4 g) was reacted with diethyl oxalate (1.1 g) in the presence of sodium methoxide for 6 hours to give 1.1 g of 5,5'-bis(4-phenyl-1,2,4-triazole-3-selenol) which sintered at 190° C.

Example 13

Preparation of p-phenylene-5,5'-bis(4-methyl-1,2,4-triazole-3-selenol)

4-methylselenosemicarbazide (7.6 g) was reacted with dimethyl terephthalate (4.8 g) in the presence of sodium methoxide for 4 hours to give 3.7 g of p-phenylene-5,5'-bis(4-methyl-1,2,4-triazole-3-selenol) of m.p. 307° C.

The compounds of the foregoing Examples correspond to the formula

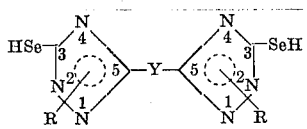

and are listed in the following table.

TABLE

| Example | —Y— | —R | Position of R | Melting point (° C.) |
|---|---|---|---|---|
| 1, 2 | Direct link | —H | | 360 |
| 3 | —CH₂— | —H | | 180–183 |
| 4 | —CH₂—CH₂— | —H | | 210 |
| 5 | —CH₂— | —CH₃ | 2 | 189 |
| 6 | —CH₂— | —CH₃ | 4 | 204 |
| 7 | —CH₂—CH₂— | —CH₃ | 4 | 244 |
| 8 | —CH₂—CH₂— | 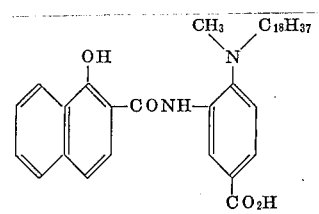 | 4 | ¹ 203 |
| 9 | Direct link | —CH₃ | 2 | ¹ 196 |
| 10 | Direct link | —CH₃ | 4 | ¹ 231 |
| 11 | —CH₂—CH₂—S—CH₂—CH₂— | —CH₃ | 4 | 200 |
| 12 | Direct link | (phenyl) | 4 | ¹ 190 |
| 13 | (phenyl) | —CH₃ | 4 | 307 |

¹ Sintering.

In the Example which follows a colour negative film was used which was made up as follows:

| Layer Order and Sensitivity | Silver Coating Weight in mg of Ag/decimetre² |
|---|---|
| Non Stress | — |
| Blue Sensitive | 13.4 |
| Colloidal Silver | — |
| Filler Layer | |
| Green Sensitive | 13.1 |
| Topcoat | |
| Intralayer | — |
| Green Sensitive | 16.0 |
| Subcoat | |
| Interlayer | — |
| Red Sensitive | 17.5 |
| Topcoat | |
| Red Sensitive | 13.6 |
| Subcoat | |
| Base of cellulose triacetate | — |
| TOTAL | 73.6 |

In this film: the blue sensitive layer contained a yellow colour coupler of the formula:

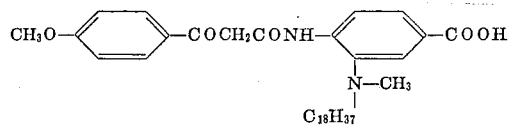

the green sensitive layers each contained a magenta colour coupler of the formula:

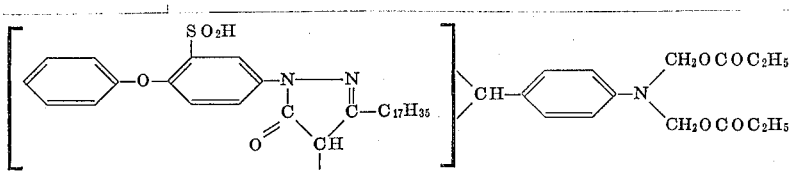

the red sensitive layers each contained a cyan colour coupler of the formula:

The following processing solutions were used in Example 14.

| Colour Developer | | |
|---|---|---|
| Sodium metaborate | 80 | g |
| Sodium sulphite anhydrous | 2.0 | g |
| Potassium bromide | 1.0 | g |
| Hydroxylamine sulphate | 2.6 | g |
| 4-amino-N-ethyl-N-(β-hydroxy ethyl)-aniline sulphate | 4.6 | g |
| Water to | 1 | litre |
| Stop-Fix | | |
| Sodium thiosulphate pentahydrate | 171 | g |
| Sodium acetate anhydrous | 31.4 | g |
| Sodium sulphite anhydrous | 4.3 | g |
| Acetic acid glacial | 35 | ml |
| Potassium alum | 17.0 | g |
| Ammonium chloride | 43 | g |
| Water to | 1 | litre |
| Bleach-Fix | | |
| Disodium tetraborate decahydrate | 12.5 | g |
| Boric acid | 22.5 | g |
| Sodium hydroxide | 10.0 | g |
| Ethylenediamine tetraacetic acid | 16.2 | g |
| Disodium salt of ethylenediamine tetraacetic acid | 3.5 | g |
| Ferric chloride (60 % ʷ/ᵣ solution) | 95 | g |
| Sodium sulphite anhydrous | 4.0 | g |
| Water to | 1 | litre |
| Conditioner | | |
| Disodium salt of ethylenediamine tetraacetic acid | 0.50 | g |
| Sodium carbonate anhydrous | 4.5 | g |
| Formaldehyde (40% ʷ/ᵣ solution) | 10 | ml |
| Wetting Agent (8 % ʷ/ᵣ solution) | 1.7 | ml |
| Water to | 1 | litre |

All processing solutions and wash water were used at 75° F.

Pieces of a colour negative film as described e.g. in the U.S. Pat. application Ser. No. 100 839 were fogged and processed in a processing sequence including the use of a bleach-fix bath. The metallic silver remaining in the film at the end of the processing sequence was measured by analysis and expressed in mg of Ag/decimetre².

When the bleach-fix bath contained one of the specified bleach-fix accelerators a reduction in the amount of residual silver resulted.

The residual silver resulting when one of the accelerators which was one of the compounds of the present invention was used is expressed as a percentage of that obtained when no accelerator was used.

Example 14

Pieces of the colour negative film were processed as follows:

| Colour developer | 10 minutes |
| --- | --- |
| Stop-fix | 4 minutes |
| Bleach-fix | 6 minutes with and without accelerator |
| Wash | 4 minutes |
| Conditioner | 4 minutes |
| Wash | 4 minutes |
| Dry | |

The silver content of the pieces of film was analysed with the following results:

TABLE 4

| Accelerator Example No. | Concentration of Accelerator in Bleach-fix bath in mg/litre | Residual Silver as % of control |
| --- | --- | --- |
| 1 | 100 | 46.1 |
| 3 | 100 | 90.6 |
| 4 | 100 | 84.5 |

We claim:

1. A 5,5'-bis(1,2,4-triazole-3-selenol) of the formula

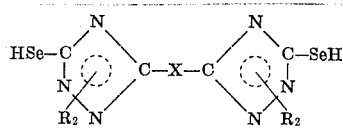

wherein each of $R_1$ and $R_2$ is selected from the group consisting of hydrogen, alkyl of 1-3 carbon atoms, phenyl, tolyl, chlorophenyl, methoxyphenyl and benzyl and X is selected from the group consisting of a direct link, an alkylene chain having 1-10 carbon atoms, phenylene, naphthylene, —NH— and a linking group —(CH$_2$-)$_m$—Y—(CH$_2$)$_n$—, wherein Y is an oxygen or sulphur atom and each of $m$ and $n$ is zero or an integer of from 1 to 5.

2. A 5,5'-bis(1,2,4-triazole-3-selenol) according to claim 1, wherein each of $R_1$ and $R_2$ is selected from the group consisting of hydrogen, alkyl of 1-3 carbon atoms, phenyl and tolyl and X is selected from the group consisting of a direct link, an alkylene chain having 1-4 carbon atoms, phenylene and a linking group —(CH$_2$)$_m$—Y—(CH$_2$)$_n$—, wherein Y is an oxygen or sulphur atom and each of $m$ and $n$ is zero or an integer of from 1 to 5.

3. A 5,5'-bis-(1,2,4-triazole-3-selenol) according to claim 2, wherein each of $R_1$ and $R_2$ is selected from hydrogen, methyl and phenyl, and X is a direct link, an alkylene chain having 1 or 2 carbon atoms, a phenylene group or a linking group —(CH$_2$)$_m$—Y—(CH$_2$)$_n$— wherein Y is sulphur and each of $m$ and $n$ is the integer 1 or 2.

4. A process for the preparation of a symmetrical 5,5'-bis-(1,2,4-triazole-3-selenol) defined in claim 1 which comprises reacting two mols of a selenosemicarbazide of the formula

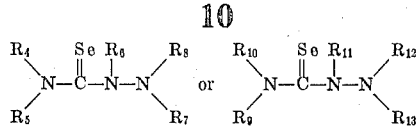

wherein each of $R_4$ - $R_{13}$ is hydrogen or one of them is selected from the group consisting of alkyl of 1-3 carbon atoms, phenyl, tolyl, chlorophenyl, methoxyphenyl and benzyl, the remainder of the R groups being hydrogen atoms, with 1 mole of a dibasic acid chloride of the formula Cl—CO—X—CO—Cl, where X is as defined in claim 1, in the presence of a base to form an acyl bis-selenosemicarbazide and heating the acyl compound in a basic medium to effect ring closure of the acyl compound.

5. A process according to claim 4 wherein the acyl compound is isolated and purified prior to effecting ring closure thereof.

6. A process according to claim 4 wherein the acylation reaction is conducted in an organic solvent at a reduced temperature.

7. A process according to claim 6 wherein the ring closure reaction is conducted in the presence of an alkali metal acetate, carbonate, hydroxide or ethoxide.

8. A process according to claim 4 wherein the dibasic acid chloride is oxalyl-, malonyl-, succinyl-, adipinyl-, thiodiacetyl-, β,β'-thiodipropionyl-or terephthaloyl-chloride.

9. A process for the preparation of a symmetrical 5,5'-bis-(1,2,4-triazole-3-selenol) defined in claim 1 which comprises reacting two moles of a selenosemicarbazide of the formula

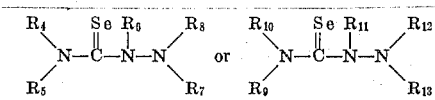

wherein each of $R_5$ - $R_{13}$ is hydrogen or one of them is selected from the group consisting of alkyl of 1-3 carbon atoms, phenyl, tolyl, chlorophenyl, methoxyphenyl and benzyl, the remainder of the R groups being hydrogen atoms, with one mole of a diester of a dibasic acid of the formula $R_{14}$OCO—X—COOR$_{15}$ wherein each of $R_{14}$ and $R_{15}$ is methyl or ethyl and X is as defined in claim 1, in an alkaline alcoholic medium and isolating and purifying the resultant product.

10. A process according to claim 9 wherein the diester of a dibasic acid is diethyloxalato, diethyloxalate, β,β'-thiodipropionate or dimethylterephthalate.

11. A process for the preparation of an unsymmetrical 5,5'-bis-(1,2,4-triazole-3-selenol) defined in claim 1 which comprises reacting one mole of a selenosemicarbazide of the formula

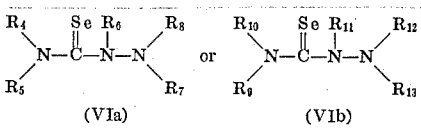

(VIa)      (VIb)

wherein each of $R_5$ - $R_{13}$ is hydrogen or one of them is selected from the group consisting of alkyl of 1-3 carbon atoms, phenyl, tolyl, chlorophenyl, methoxyphenyl and benzyl, the remainder of the R groups being hydrogen atoms, with an acid chloride-half ester of a dibasic acid of the formula $R_{14}$OCO — X — CO—Cl, where $R_{14}$ is methyl or ethyl and X is as defined in claim 1, in the presence of a base to form the half-ester-acyl compound of the selenosemicarbazide, isolating and purifying the half-ester-acyl compound, heating the purified compound with one mole of a selenosemicarbazide of the formula (VIb) or (VIa) respectively in an alkaline alcoholic medium and isolating the resultant product.

12. A process for the preparation of an unsymmetrical 5,5'-bis-(1,2,4-triazole-3-selenol) defined in claim 1 which comprises reacting one mole of a selenosemicarbazide of the formula

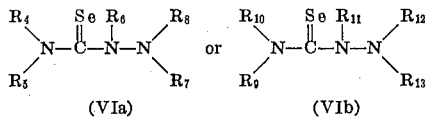

(VIa)          (VIb)

wherein each of $R_5 - R_{13}$ is hydrogen or one of them is selected from the group consisting of alkyl of 1–3 carbon atoms, phenyl, tolyl, chlorophenyl, methoxyphenyl and benzyl, the remainder of the R groups being hydrogen atoms, with an excess of a diester of a dibasic acid of the formula $R_{14}OCO—X—COOR_{15}$ where each of $R_{14}$ and $R_{15}$ is methyl or ethyl and X is as defined in claim 1, in an alkaline alcoholic medium, isolating and purifying the resultant product, reacting the purified product with one mole of a selenosemicarbazide of the formula (VIa) or VIb) respectively in an alkaline alcoholic medium and isolating and purifying the product thus obtained.

* * * * *